June 5, 1934.                G. E. GAUS                1,961,418
                            WIRE BALE TIE
                         Filed Dec. 16, 1932
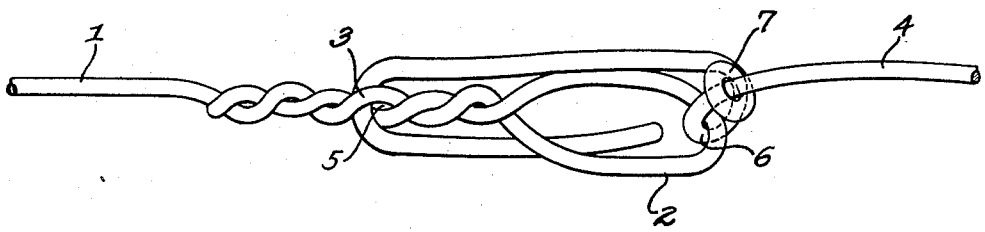
INVENTOR
George E. Gaus
By
        Attorney.

Patented June 5, 1934

1,961,418

UNITED STATES PATENT OFFICE 1,961,418

WIRE BALE-TIE

George E. Gaus, Washington, D. C., dedicated to the free use of the Government and the People Application December 16, 1932, Serial No. 647,605

1 Claim. (Cl. 24—27)

(Granted under the act of March 3, 1883, as amended April 30, 1928; 370 O. G. 757)

This application is made under the act of March 3, 1883, as amended by the act of April 30, 1928, and the invention herein described may be manufactured and used by or for the Government for governmental purposes without the payment to me of any royalty thereon.

I hereby dedicate this invention to the free use of the Government and the people of the United States.

This invention relates to that class of bands formed of wire that are made to be adjusted as to their girth, and has for its object to provide a bale-tie of simple inexpensive construction permitting the tying of the wire without special tools.

My invention provides a locking feature to prevent the ends of the bale-tie from separating under strain of the expansive pressure of the baled material.

My invention also provides means for holding the free or snag end of the wire in close contact with the baled material, thus obviating any danger of physical injury caused from the protruding end of the wire, upon handling the baled material.

One of the locking features is an eye so fabricated in the wire that the sides of the eye exert a clamping pressure on the adjustable member when the bale-tie is subjected to strain. This clamping pressure coupled with the angular friction produced by the closed end of the clamp-eye, when the bale-tie is subjected to strain, prevents slipping of the adjustable member. Another locking feature is formed by the posture of the bends made in the adjustable member in contact with the end loop of the fixed member of my bale-tie.

Accompanying this specification, and to form part of it, there is a drawing illustrating a plan view of my invention.

Referring to the drawing, bale wire 1, being the body of the band, and having loop 2 and an eye 3, formed at one end by bending and twisting the end of the wire back on itself, thus forming loop 2 followed by eye 3, situate in the twisted portion of bale wire 1, for the purpose of securing the free end of the band, or adjustable member, as hereinafter set forth.

In making the tie, the bale wire is passed around the girth of the bale in the conventional manner. Free end 4 of bale wire 1 is then passed through loop 2, and doubled backwardly upon itself in the form of a U. The short leg of this U is tightly wound around the standing part of free end 4, forming bend 6 around loop 2, and encircling bend 7 in close contact with the outside of loop 2. Free end 4 is then brought over loop 2, inserted through eye 3 and bent backwardly upon itself, having its snag end lodged within loop 2 and adjacent to the surface of the baled material.

When strain is exerted on bale wire 1, the effect on the tie is to elongate loop 2 and close eye 3, causing the sides of eye 3 to nip free end 4 and to jam its enclosed bend into friction notch 5, also to straighten out said free end 4 through encircling bend 6 thereby causing tightening of bend 6 about loop 2 and tightening contact of encircling bend 6 with the standing part of free end 4, and forming an additional binding by jamming encircling bend 7 against loop 2, thereby providing five securing features for my bale-tie, and preventing all possibility of the tie having its ends separated under any strain which can be sustained by the body of the band.

I have found that when eye 3 is placed at right angles to the plane of loop 2 and their common axis falling within said band, the operation of tying is facilitated by reason of the fact that contact of the extremity of free end 4 with the surface of the bale is avoided during the process of drawing free end 4 tightly through eye 3 and forming the U-bend at eye 3.

Having thus described my invention,

I claim:

A bale-tie consisting of a length of wire having a multiplicity of engagements formed thereon, consisting of a twisted portion forming a loop at one end, an eye formed in said twisted portion, said eye lying substantially in a plane at right angles to the plane of said loop and their common axis falling within said wire, and an adjustable plain end passed through said loop, doubled back and bent around itself and bent into engagement with the body of the wire by means of said eye, and its extremity being then confined beneath that portion of the end forming said loop, said means being constructed and arranged to connect substantially as described.

GEORGE E. GAUS.